(No Model.)

C. E. CANDEE.
CUFF HOLDER.

No. 369,160. Patented Aug. 30, 1887.

WITNESSES:
John W. Deemer
C. Sedgwick

INVENTOR:
C. E. Candee
BY
Munn & Co.
ATTORNEYS.

UNITED STATES PATENT OFFICE.

CHARLES E. CANDEE, OF NEW YORK, N. Y.

CUFF-HOLDER.

SPECIFICATION forming part of Letters Patent No. 369,160, dated August 30, 1887.

Application filed June 21, 1887. Serial No. 242,005. (No model.)

*To all whom it may concern:*

Be it known that I, CHARLES E. CANDEE, of the city, county, and State of New York, have invented a new and useful Improvement in Cuff-Holders, of which the following is a full, clear, and exact description.

This invention more particularly relates to that description of cuff holders or fasteners more especially designed for ladies' use, which are made of or from spring-wire constructed to form a safety-pin at the one end of the device for engagement with the sleeve of the dress and constructed at the opposite end to connect with the cuff, although in the present instance not directly, but through the intervention of the cuff button or stud, not, however, through an attached elastic cord formed into a close loop, as has heretofore been done.

The invention consists in a peculiar and special construction of such a cuff holder or fastener, substantially as hereinafter described, and pointed out in the claims.

Reference is to be had to the accompanying drawings, forming a part of this specification, in which similar letters of reference indicate corresponding parts in all the figures.

Figure 1:
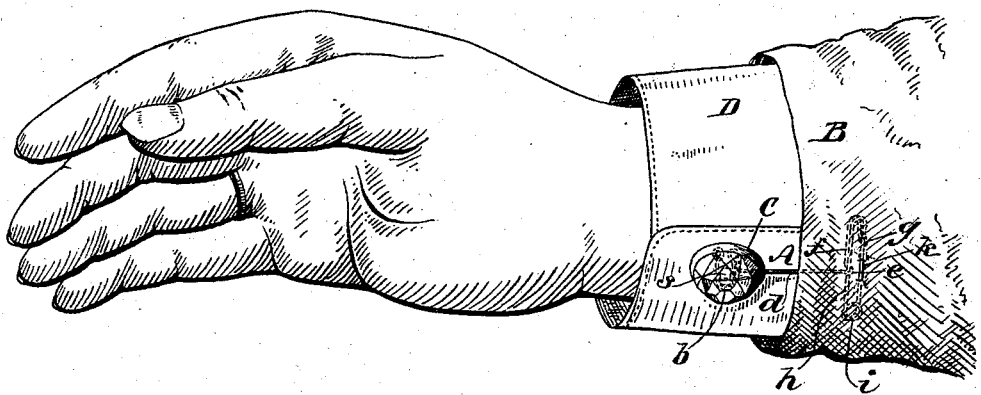
Figure 2:
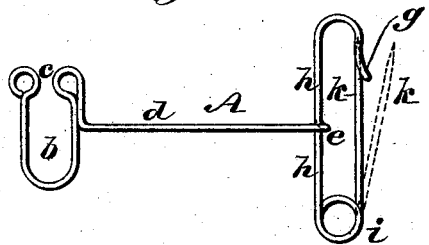
Figure 3:
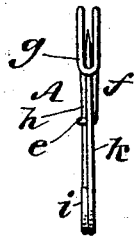

Figure 1 represents a view in perspective of my improved cuff-fastener as applied to a lady's cuff and sleeve when on the arm or person of the wearer. Fig. 2 is a longitudinal view, upon a larger scale, of the cuff-fastener detached, and Fig. 3 is an end view of the same from the safety-pin end of the fastener.

The whole fastener A is or may be made from a single piece of light spring-wire bent at its one end to form a spring-hook or open-ended loop, $b$, having a contracted throat or mouth, $c$, and arranged in transverse relation with the stem or shank $d$ of the fastener. The other end of the stem $d$, which may be a straight one and of any desired length, is first bent over to form an eye, $e$, then bent outward to one side, as at $f$, in the same plane, or nearly so, as the hook or loop $b$, then turned back and over and bent to form a hook-shaped loop, $g$, the one side of which is bent and continued to form a cross member or portion, $h$, parallel, or nearly so, with the portion $f$, and made to pass through the eye $e$ to the opposite side of the stem $d$, then bent to form a spring-coil, $i$, and subsequently extended back again crosswise of the stem and sharpened or pointed at its outer end to form a pin, $k$. This pin $k$ should be sufficiently long to engage, when closed, after the manner of a safety-pin, which it and its immediate parts constitute, under and within the hook-shaped loop $g$, as more clearly shown by full lines in Figs. 2 and 3. When disengaged the pin $k$ is thrown outward by the tension of the spring-coil $i$, as shown by dotted lines in Fig. 2.

To apply the fastener, the pin $k$ is disengaged from the hook-shaped loop $g$, and it and the whole safety-pin portion of the fastener passed under the sleeve B of the dress, and the pin $k$ passed outward and back again through said sleeve, and its pointed end engaged with the hook-shaped loop $g$, as shown in Fig. 1. The hook or open-ended loop portion $b$ of the fastener is then passed under the head of the button C of the cuff D and made to engage with the shank $s$ of said button, whereby the fastener holds the cuff in place and keeps it suitably projected beyond the end of the sleeve, as illustrated in Fig. 1 of the drawings.

As the fastener is made of light wire and but little of it exposed when applied, it will present no unsightly appearance, while it will form a very secure cuff holder, yet admit of the cuff being readily detached when required to change it for another, by simply disengaging the open-ended loop portion $b$ of the fastener from the shank of the cuff-button.

The open-ended loop portion $b$ of the fastener, it should be observed, occupies a fixed and approximately parallel position relatively to the safety-pin at the other end of the fastener, and by its construction, as described, it forms a metallic spring open-ended clasp or jaw, which, while it readily yields at its contracted open end or mouth to pass the shank of the cuff-button into or out of it, securely holds, without stretch, onto the button when engaged, and requires no nice or difficult fingering to disengage it.

Having thus described my invention, what I claim as new, and desire to secure by Letters Patent, is—

1. The metal cuff-holder herein described, consisting of a body portion or stem, an open-ended spring-clasp at one end of said stem adapted to embrace the shank of a cuff-button, and a safety-pin at the other end adapted to engage with the sleeve of the garment, said spring-clasp and safety-pin being in transverse relation to the body portion of the cuff-holder, substantially as specified.

2. The within-described cuff fastener or holder A, constructed of a piece of light spring-wire made to form a stem, $d$, shaped or bent at its one end into an open-ended spring-loop, $b$, in transverse relation with the stem and having a contracted throat or mouth, $c$, and shaped or bent at its opposite end to form an eye, $e$, and lateral arm or portion $f$, then turned back and over and bent to form a hook-shaped loop, $g$, and continued to form a cross member or portion, $h$, which passes through the eye and is bent into a spring-coil, $i$, on the opposite side of the stem to the loop $g$ and continued and fashioned to form a pin, $k$, which is adapted to engage with the loop $g$, as set forth.

CHARLES E. CANDEE.

Witnesses:
E. D. STAIR,
C. SEDGWICK.